United States Patent
Chen et al.

(10) Patent No.: US 9,765,817 B1
(45) Date of Patent: *Sep. 19, 2017

(54) HYDROSTATIC BEARING ASSEMBLY

(71) Applicant: Industrial Technology Research Institute, Hsin-Chu (TW)

(72) Inventors: Shang-Te Chen, Taichung (TW); Chih-Ming Chen, Taichung (TW); Po-Hsiu Ko, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,108

(22) Filed: May 11, 2016

(30) Foreign Application Priority Data

Mar. 15, 2016 (TW) .............................. 105107947 A (51) Int. Cl.
*F16C 32/06* (2006.01)
*F16C 33/10* (2006.01)
*F16C 17/00* (2006.01)

(52) U.S. Cl.
CPC ...... *F16C 32/0696* (2013.01); *F16C 32/0651* (2013.01); *F16C 33/1045* (2013.01); *F16C 33/1055* (2013.01); *F16C 2226/60* (2013.01); *F16C 2360/31* (2013.01)

(58) Field of Classification Search
CPC .............. F16C 32/0696; F16C 32/0651; F16C 32/0662; F16C 2360/31; F16C 17/00; F16C 33/02; F16C 33/10; F16C 33/1045; F16C 2226/60

USPC ... 384/91, 99, 100, 105, 116, 305, 107, 113, 384/282, 290
See application file for complete search history.

(56) References Cited

U.S. PATENT DOCUMENTS

| | | | |
|---|---|---|---|
| 3,362,231 A * | 1/1968 | Baldwin | G01C 19/20 74/5 R |
| 3,384,425 A | 5/1968 | Brown | |
| 3,476,444 A | 11/1969 | Dunfee | |
| 3,653,267 A * | 4/1972 | Jacobson | F04B 43/084 417/383 |

(Continued)

FOREIGN PATENT DOCUMENTS

CN 202833785 U 3/2013
CN 103438097 12/2013

(Continued)

OTHER PUBLICATIONS

Taiwan Intellectual Property Office, Office Action dated Dec. 23, 2016.

(Continued)

*Primary Examiner* — Marcus Charles
(74) *Attorney, Agent, or Firm* — WPAT, PC (57) ABSTRACT

A hydrostatic bearing assembly for a shaft is disclosed, which consists of a base ring, two side rings enclosed up the base ring at both sides, and a plurality of hydrostatic blocks fixed respectively on surfaces of the base ring and of the side rings corresponded to the shaft, as result to hold the shaft to resist against loadings from the axial direction and/or the radial direction and provide lubrication through oil passages inside. These hydrostatic blocks are locked with screws or bolts on the base ring and on the side rings in order to be replaced individually on site.

14 Claims, 6 Drawing Sheets

(56) References Cited

U.S. PATENT DOCUMENTS

| | | | |
|---|---|---|---|
| 3,785,708 A * | 1/1974 | Miyasaki | F16C 32/0648 384/111 |
| 4,097,094 A * | 6/1978 | Gardner | F16C 17/02 384/215 |
| 4,368,930 A | 1/1983 | Duchaine | |
| 4,448,460 A | 5/1984 | Yamamoto | |
| 4,457,634 A * | 7/1984 | Vinciguerra | F16C 17/03 384/215 |
| 4,460,283 A * | 7/1984 | Yoshioka | F01D 25/164 384/119 |
| 4,815,865 A * | 3/1989 | Gerling | F16C 33/1045 384/117 |
| 4,915,510 A * | 4/1990 | Arvidsson | F16C 23/02 384/121 |
| 6,091,175 A * | 7/2000 | Kinsinger | F16C 17/22 277/438 |
| 6,428,210 B1 | 8/2002 | Kafai | |
| 6,502,987 B2 | 1/2003 | Kafai | |
| 8,075,190 B1 | 12/2011 | Wadehn et al. | |
| 8,083,413 B2 * | 12/2011 | Ertas | F16C 17/035 384/117 |
| 8,172,531 B2 | 5/2012 | Wadehn | |
| 8,366,323 B2 * | 2/2013 | Waki | F16C 17/03 384/117 |
| 8,556,509 B2 | 10/2013 | Sung et al. | |
| 8,770,841 B2 | 7/2014 | Chen et al. | |

FOREIGN PATENT DOCUMENTS

| | | | | |
|---|---|---|---|---|
| CN | 103782028 A | | 5/2014 | |
| EP | 2474733 | | 7/2012 | |
| GB | 1011532 A | * | 12/1965 | F04B 1/2042 |
| TW | 306586 | | 5/1997 | |
| TW | M390375 | | 10/2010 | |
| TW | M416698 | | 11/2011 | |
| TW | I412673 | | 10/2013 | |
| TW | M494666 | | 2/2015 | |
| WO | WO-2014130929 A1 | * | 8/2014 | F16C 32/0648 |

OTHER PUBLICATIONS

Su, "Design and Operation Maintenance for Wind-power Generator" Jan. 1, 2003, www.cepp.com.cn, China.

Souichi Yagi, "Bearings for Wind Turbine", 2004, Industrial Sales Headquarters, New Technology Network Technical Review No. 71.

Lin, "Failure Analysis for Large Wind-Power Generator" 2009, Taiwan Machinery & Hardware Monthly, Taiwan.

Gerald Fox and Eric Jallat, "Use of the Integrated Flexpin Bearing for Improving the Performance of Epicyclical Gear Systems", 2008, The Timken Company, USA.

Industrial Technology Research Institute, "Information Relating to Wind-power Industry" Jan. 4, 2008, Green Energy Industry Information Net, Taiwan.

Leung, "Bearings in wind turbine", Apr. 2, 2010, SKF Group.

\* cited by examiner

HYDROSTATIC BEARING ASSEMBLY

CROSS-REFERENCE TO RELATED APPLICATION

This application claims the priority benefit of Taiwan Patent Application No. 105,107,947, filed on Mar. 15, 2016. The entirety of the above-mentioned patent application is hereby incorporated by reference herein and made a part of this specification.

TECHNICAL FIELD

The disclosure is related to a bearing assembly, and particularly to a hydrostatic bearing assembly of which components can be individually replaced on site.

BACKGROUND

Modern wind turbines are usually set up on beaches or on sea water for converting strong wind into electrical power. The main wearing components mounted inside the nacelle, such as bearings, may need to be maintained timely, if do so, the nacelle and blades connected together need to be disassembled first from the top of the tower, and then hanged down on the ground or on the deck for replacement. As result it will be a hard task which not only costs money but takes time, and probably even gets worse when the weather is bad.

Besides the wind turbine, it likely needs to provide a possible solution to replace worn component, such as bearings, of any other machine that would not be allowed to be disassembled or to be moved on site.

SUMMARY

One embodiment of the disclosure is to provide a hydrostatic bearing assembly for a shaft, which comprises a base ring, two side rings enclosed up the base ring at both sides, and a plurality of hydrostatic blocks fixed respectively on surfaces of the base ring and of the side rings as to hold the shaft. These hydrostatic blocks are configured to be replaced individually if worn out.

Another embodiment of the disclosure is yet provide a hydrostatic bearing assembly for a shaft, which comprises a base ring, two side rings enclosed up the base ring at both sides, and a plurality of hydrostatic blocks fixed on an surface of the base ring as to hold the shaft. These hydrostatic blocks are configured to be replaced individually if worn out.

In order to make the aforementioned features of the disclosure more comprehensible, the embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In the following, the embodiments of the disclosure are described in detail. These descriptions are intended to explain the structure or the step process of the disclosure, and are not intended to limit the disclosure, and therefore the disclosure is not limited thereto.

Figure 1:
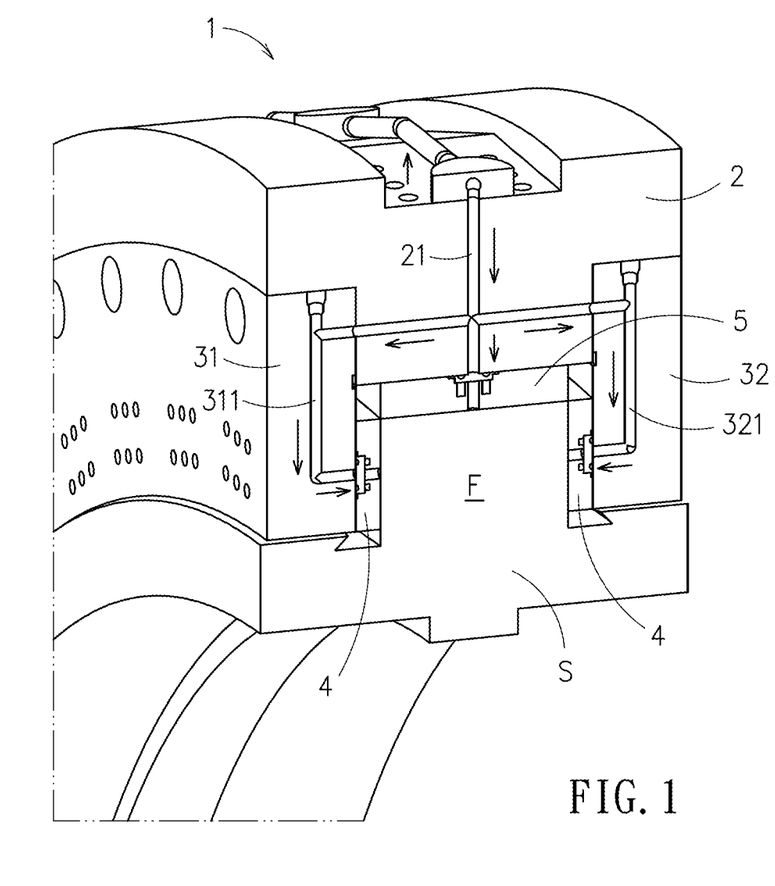
FIG. 1 is a cross-sectional view of a hydrostatic bearing assembly according to an embodiment of the disclosure.

FIG. 1 is a cross-sectional view of a hydrostatic bearing assembly according to an embodiment of the disclosure. From FIG. 1, for example, the hydrostatic bearing assembly 1 mainly consists of a base ring 2, two side rings 31, 32 which enclose up the base ring 2 with screws or bolts at both sides, and a plurality of hydrostatic blocks 4, 5. The base ring 2 is fixed on inside the nacelle of a wind turbine (not showed in figure), and the hydrostatic blocks 4, 5 are also fixed respectively on inside surfaces of the two side rings 31, 32, and of the base ring 2 which are corresponded to the shaft S of the turbine. The hydrostatic blocks 4, 5 are locked with screws or bolts respectively to the side rings 31, 32 and to the base ring 2, as to support and to lubricate the shaft S in the axial direction and in the radial direction with an appropriate pressure on the shaft S, and so all above are stationary except the shaft S. Because the shaft S receives an axial thrust from the blades via a hub (not showed), so that the axial hydrostatic blocks 4 are optionally needed to resist against the thrust. However this situation should not be a limitation to the disclosure if there is no such thrust.

Referring to FIG. 1, the base ring 2 and the side rings 31, 32, as of rings with holes (not indexed in figure) outside for fixture, have respectively a main oil passage 21 and secondary oil passages 311, 321 inside for lubrication to the shaft S with oil. These oil passages 21, 311, 321 can be aligned up and be through to each other after the side rings 31, 32 are correctly locked on the base ring 2 at both sides. An external oil lubrication system (not showed) provides oil with a pressure for lubricating from the holes, for example, of the base ring 2 to the hydrostatic blocks 4, 5 via these oil passages 21, 311, 321 (as arrows showed). The hydrostatic blocks 4, 5 optionally have respectively a restrictor inside to receive oil to form oil layers (not showed) on the surfaces of the shaft S. The excess oil after lubricated can be returned back to the oil lubrication system via another interior oil passages (not showed) of the base ring 2, or via any small gaps therebetween to complete a cycle.

Figure 5:
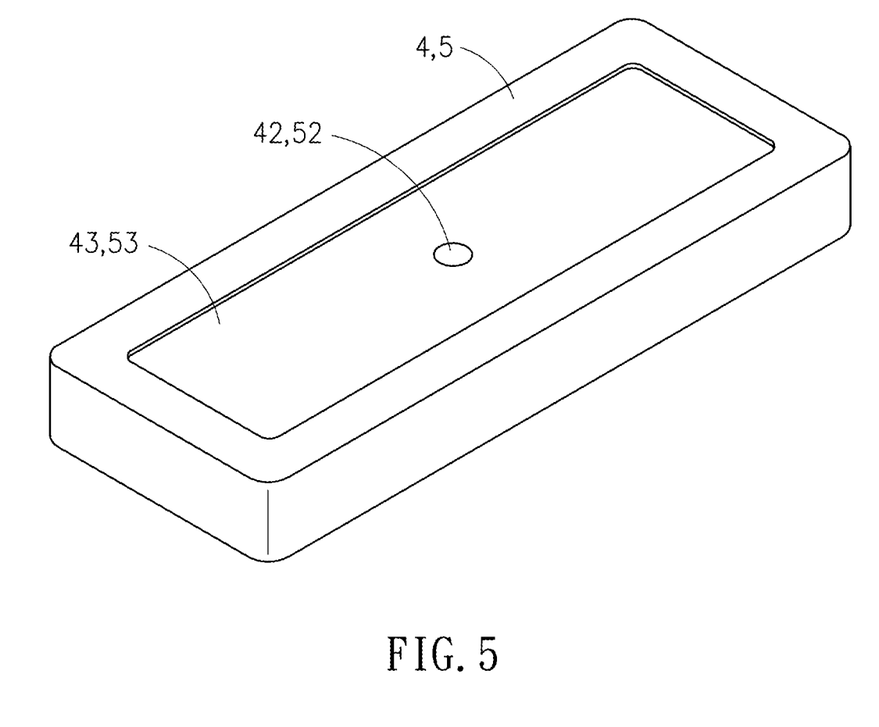
FIG. 5 is a perspective view of a hydrostatic block.
Figure 6:
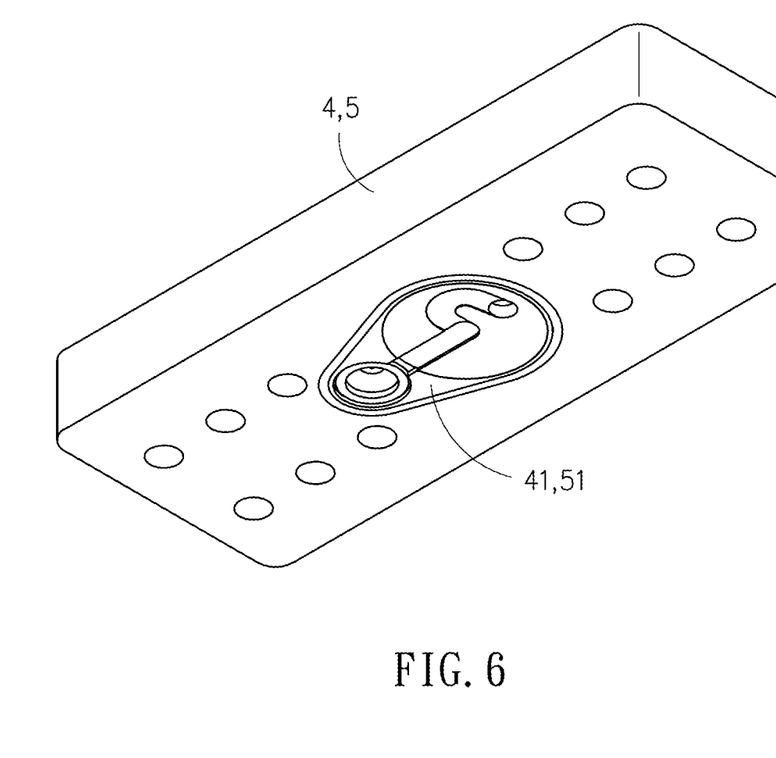
FIG. 6 is another perspective view of the hydrostatic block showed in FIG. 5.

The hydrostatic blocks 4, 5, although being separated as the axial hydrostatic block 4 and the radial hydrostatic block 5 of name in the disclosure, actually they have the same interior structure. Please refer to FIG. 5, FIG. 6 and U.S. Pat. No. 8,770,841. The hydrostatic blocks 4, 5 or the plate bearing have respectively an oil restrictor (not showed) inside, an oil inlet 41, 51 on a surface to the base ring 2 or to the side rings 31, 32, and an oil outlet 42, 52 on the other surface to the shaft S. The oil with a pressure from the oil lubrication system can flow into the oil inlets 41, 51 through the passages 21, 311, 321 and emerge out from the oil outlets 42, 52 as to form thin oil layers on cavities 43, 53 for lubricating the contact surfaces of the shaft S. The axial hydrostatic block 4 and the radial hydrostatic block 5 can have different shapes or dimensions of the contact surfaces outside, planar or curved, as to be fitted into any gaps between the base ring 2 and the side rings 31, 32 respectively to the shaft S.

In FIG. 1 and according to the above embodiment, the shaft S of the turbine has a flange F to contact the axial hydrostatic blocks 4 as to resist against the axial thrust from the blades. However in other machine, there is no such possible axial thrust, thus the flange is no more needed, and as result the axial hydrostatic blocks 4 can be removed. The hydrostatic blocks 4, 5 in the embodiment although are disclosed above to be applied with the hydrostatic plate bearing of U.S. Pat. No. 8,770,841, any other wear-resisting hydrostatic blocks capable to form oil layer, even with or without restrictor inside, are actually approved, and this should not be a limitation to the disclosure.

Figure 2:
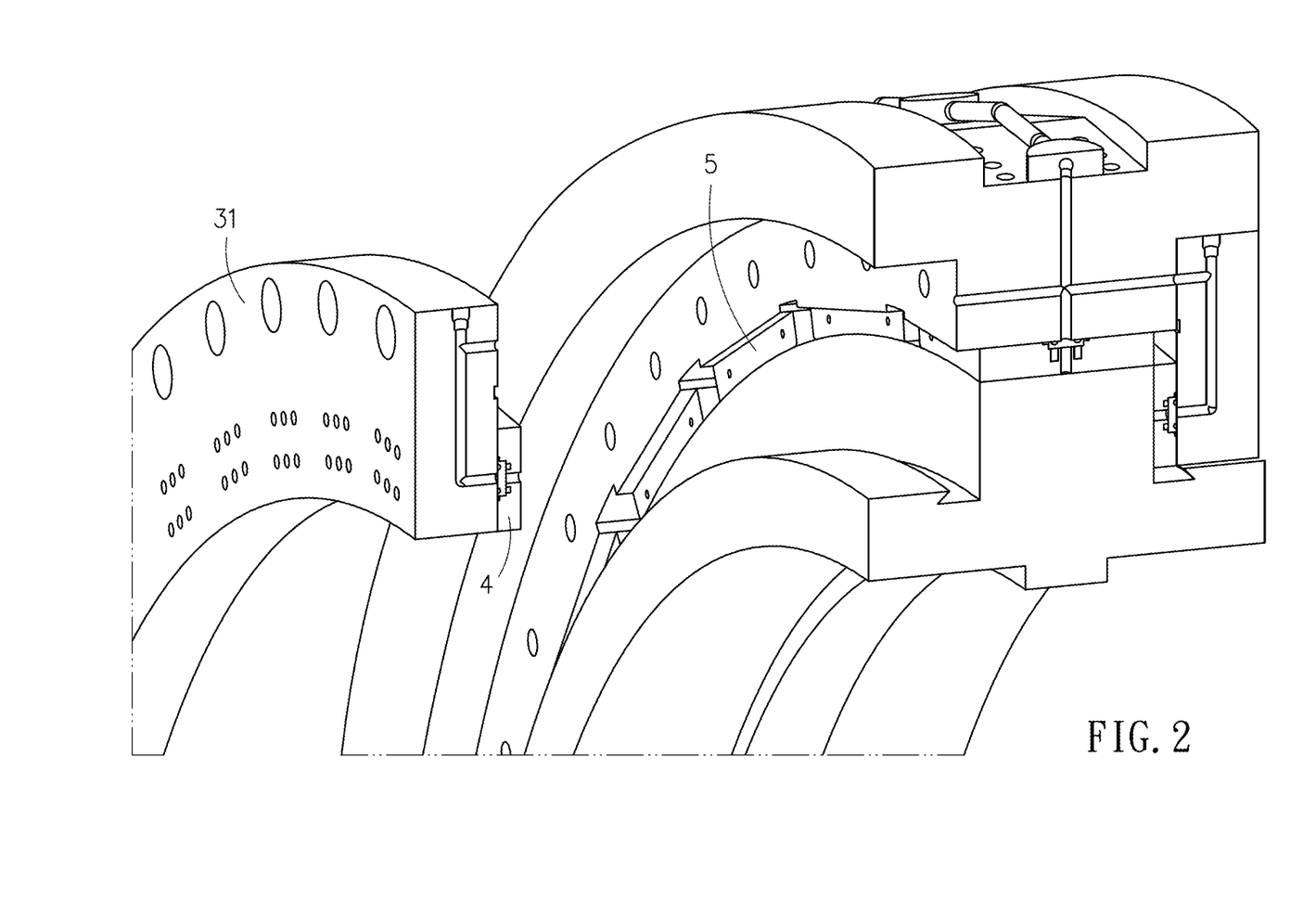
FIG. 2 is a cross-sectional view in which a side ring is moved out from the hydrostatic bearing assembly showed in FIG. 1.

Depend on the stress distribution of the shaft S, the hydrostatic blocks 4, 5, as showed in FIG. 2, are respectively located equally or unequally, in number or in position, on the inside circumference surfaces of the base ring 2 and the two side rings 31, 32. However, in many situations, these hydrostatic blocks 4, 5 can be re-arranged in number and/or in position on the surfaces as to meet the requirement of design. Moreover, these hydrostatic blocks 4, 5 can be optionally connected to an external monitoring system for consideration of replacement, for example as an embodiment described in U.S. patent application Ser. No. 14/969,290. Engineer can monitor all these hydrostatic blocks 4, 5 at a distance according to the variation of oil parameters from the system to decide which of them needs to be replaced.

Figure 3:
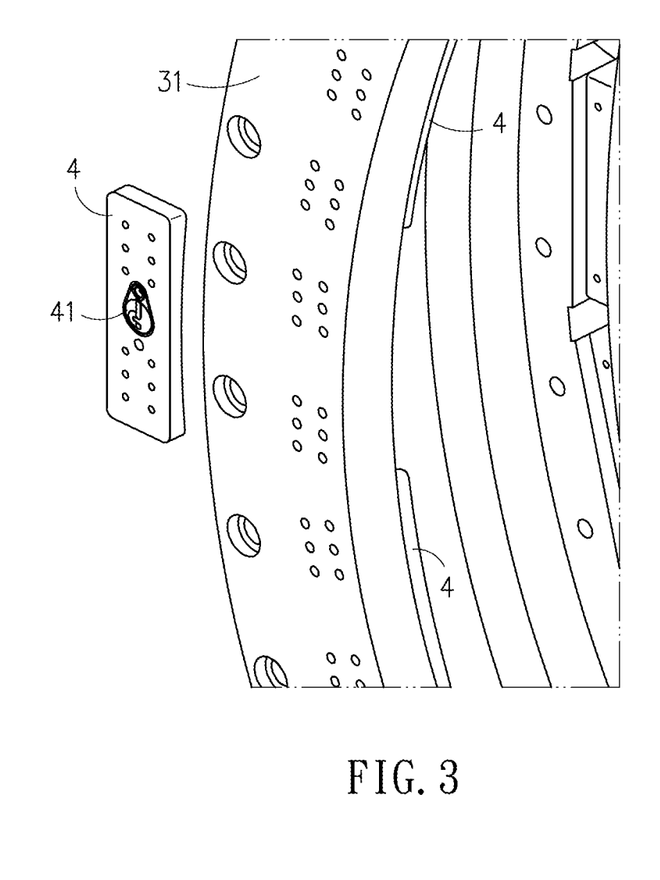
FIG. 3 is a partial perspective view in which an axial hydrostatic block is moved out from the side ring showed in FIG. 2.
Figure 4:
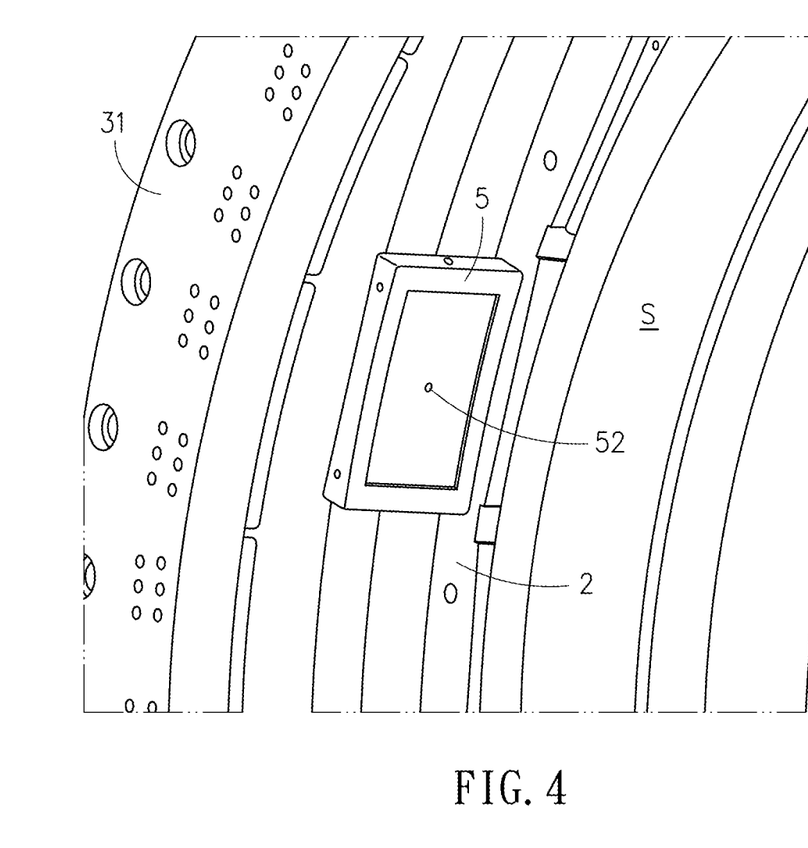
FIG. 4 is a partial perspective view in which a radial hydrostatic block is extracted out from the base ring showed in FIG. 2.

The disclosure provides an easy way to replace worn hydrostatic blocks on site without moving or disassembled any other components that are not relevant. In accordance to the above application of wind turbine, if the space inside the nacelle is allowed and a replacement decision is approved, engineer needs only to take necessary spare hydrostatic blocks and hand tools to do the replacement in the nacelle without hanging down the nacelle. As showed in FIG. 2 and FIG. 3, only by releasing screws or bolts (not showed) from outside, one of or both the side rings 31, 32 can be moved out from the base ring 2, and then the worn hydrostatic block 4 can be replaced with a spare one. Similarly in FIG. 4, after screws or bolts (not showed) on the outside circumference surface of the base ring 2 are released down, the worn hydrostatic block 5 can also be extracted out in axial direction for replacement. The replacement of hydrostatic block is taken by blocks and by rings, therefor at the same moment, the stability of the shaft S is quite confirmed.

Another embodiment of the disclosure is also provided herein. If the shaft S does not have the flange F or the like as once described above, the two side rings 31, 32 are only taken to enclose up the base ring 2 at both sides, and the axial hydrostatic blocks 4 as result then need to be removed except the radial hydrostatic blocks 5. The oil from the oil lubrication system will flow directly into the hydrostatic blocks 5 via the oil passages 21 and emerge out later from the oil outlet 52 to the surface of the shaft S, as showed in FIG. 1 and as described above.

With helps of the detailed description of the two embodiments above, the main progresses of the disclosure are simply to provide a safe and easy way to be applied with to replace the worn hydrostatic block in the nacelle or in other cabin without disassembling any other components not relevant, or even without replacing the whole expensive bearing assembly 1.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hydrostatic bearing assembly, comprising:
   a shaft, comprising a flange;
   a base ring, comprising a main oil passage disposed through said base ring;
   a radial hydrostatic block, removably affixed on an inner radial surface of said base ring and directly adjacent to an outer radial surface of said flange;
   a first side ring, comprising a first side oil passage disposed through said first side ring;
   a first axial hydrostatic block, removably affixed on said first side ring and directly adjacent to a first axial surface of said flange;
   a second side ring, comprising a second side oil passage disposed through said second side ring;
   a second axial hydrostatic block, removably affixed on said second side ring and directly adjacent to a second axial surface of said flange opposite to said first axial surface of said flange.

2. The hydrostatic bearing assembly of claim 1, wherein said radial hydrostatic block, said first axial hydrostatic block, and said second axial hydrostatic block are respectively fixed on said base ring, said first side ring, and said second side ring with screws, bolts or the combination.

3. The hydrostatic bearing assembly of claim 1, wherein the main oil passage, the secondary oil passage, the oil inlet and the oil outlet are in fluid communication with each other.

4. The hydrostatic bearing assembly of claim 1, wherein said radial hydrostatic block, said first axial hydrostatic block, and said second axial hydrostatic block are radially aligned about said shaft.

5. The hydrostatic bearing assembly of claim 1, wherein the hydrostatic blocks are fixed on the surface with screws, bolts or the combination.

6. The hydrostatic bearing assembly of claim 1, wherein the main oil passage, the oil inlet and the oil outlet are in fluid communication with each other.

7. The hydrostatic bearing assembly of claim 1, wherein the hydrostatic blocks are equidistantly spaced on the surface.

8. The hydrostatic bearing assembly of claim 1, wherein the hydrostatic blocks are irregularly spaced on the surface.

9. The hydrostatic bearing assembly of claim 1, wherein said radial hydrostatic block comprises:
   a radial oil inlet; and
   a radial oil outlet, directly adjacent to a radial surface of said flange.

10. The hydrostatic bearing assembly of claim 9, wherein said first axial hydrostatic block comprises:
    a first axial oil inlet; and
    a first axial oil outlet, directly adjacent to a first axial surface of said flange.

11. The hydrostatic bearing assembly of claim 10, wherein said second axial hydrostatic block comprises:
    a second axial oil inlet; and a second axial oil outlet, directly adjacent to a second axial surface of said flange opposite from said first axial surface.

12. The hydrostatic bearing assembly of claim 1, wherein said first axial hydrostatic block comprises:
- a first axial oil inlet; and
- a first axial oil outlet, directly adjacent to a first axial surface of said flange.

13. The hydrostatic bearing assembly of claim 1, wherein said second axial hydrostatic block comprises:
- a second axial oil inlet; and
- a second axial oil outlet, directly adjacent to a second axial surface of said flange opposite from said first axial surface.

14. A hydrostatic bearing assembly for a shaft, comprising:
- a base ring, comprising a main oil passage disposed through said base ring;
- two side rings enclosing the base ring on opposite sides; and
- a plurality of hydrostatic blocks, removably affixed on a surface of the base ring between said base ring and said shaft, each hydrostatic block comprising:
- an oil inlet; and
- an oil outlet, directly adjacent to said shaft.

* * * * *